March 23, 1965 J. W. RYAN 3,174,756

SOUND TRANSMITTING TONE ARM SUSPENSION

Filed March 13, 1962 2 Sheets-Sheet 1

INVENTOR.

JOHN W. RYAN

BY Albert Herzig

ATTORNEY.

SOUND TRANSMITTING TONE ARM SUSPENSION

Filed March 13, 1962

2 Sheets-Sheet 2

INVENTOR.
JOHN W. RYAN
BY
Albert M. Herzig
ATTORNEY.

United States Patent Office 3,174,756

Patented Mar. 23, 1965

3,174,756

SOUND TRANSMITTING TONE ARM SUSPENSION

John W. Ryan, Bel Air, Calif., assignor to Mattel, Inc., Hawthorne, Calif., a corporation of California Filed Mar. 13, 1962, Ser. No. 179,316
4 Claims. (Cl. 274—26)

This invention relates to acoustics and more especially to a modification of a phonograph tone arm mounting of the type shown in co-pending application Serial No. 170,-643, filed February 2, 1962 and issued as Patent No. 3, 095,201, June 25, 1963.

The present invention is directed to an improved acoustic transmission system in the mounting of the tone arm to a phonograph body and the coupling of the tone arm to the reproducing cone or speaker thereof. This coupling is in the form of a sleeve for the bushing or pin connecting the tone arm to the reproducing cone, the sleeve being constituted by a viscous grease, such as a silicone, which has the characteristic of being able to transmit the normal sound frequencies with relatively small amounts of loss of motion or distortion and at the same time substantially suppress or minimize the transmission of low frequency vibrations created from mechanical movements from any part of the phonograph.

Therefore, the general purpose and objective of this invention is to provide novel improvements in the acoustical system of a phonograph.

Another object of the invention is to provide an improved acoustic transmission system in a phonograph wherein transmission of sound frequencies occurs while low frequencies of mechanically induced displacements are substantially suppressed.

A further object of the invention is the provision of a novel and essentially fluid coupling between the tone arm and the reproducing cone of a phonograph.

A further object of the invention is to provide a novel and improved tone arm pivot formation which in effect is a fluid connection.

With these and other objects and advantages of the invention in mind, the invention is shown and described in the accompanying specification and drawings by way of exemplification but not of limitation.

Figure 1:
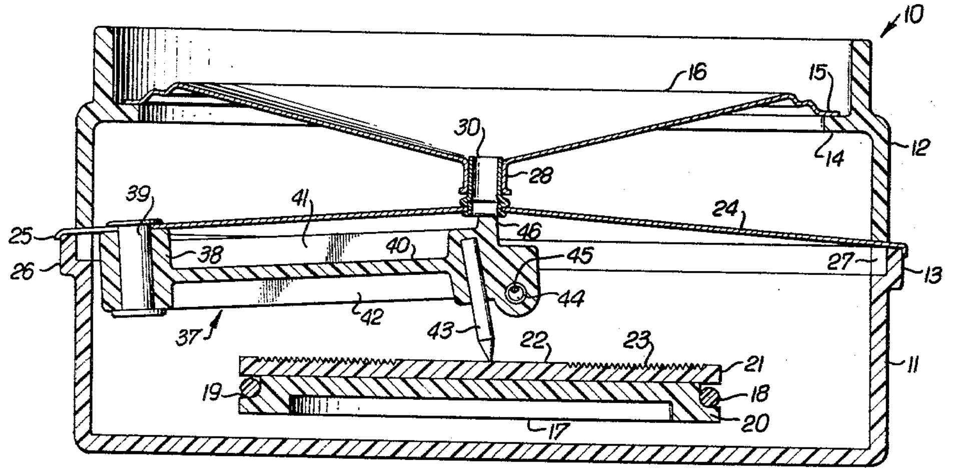
FIGURE 1 is a view in central section of a phonograph incorporating one form of the acoustic transmission system of this invention.
Figure 2:
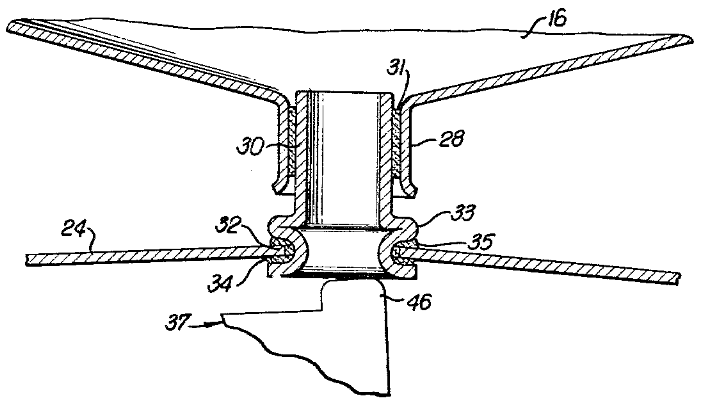
FIGURES 2 is a fragmentary view enlarged of the same.

Referring more particularly to the drawing and especially to FIGS. 1 and 2 there is there shown a phonograph designated generally by the numeral 10 having an acoustic transmission system of the general type shown in my co-pending application Serial No. 83,965, now Patent Number 3,082,006, the phonograph there being incorporated in a talking or speaking doll. Phonograph 10 is embodied in a plastic housing or casing having a lower portion or half 11 and a cap or cover 12. The lower part 11 has a continuous peripheral shoulder 13 which fits against the edge of upper part 12 when it is in position and the two parts may be additionally secured together by tongue and groove securements. Upper part 12 has an inwardly directed flange 14 on which rests the peripheral edge portion 15 of a reproducing cone or speaker 16.

Lower portion 11 of the housing provides suitable mounting for a spring wound or electric motor, not shown. Such motor drives a disc 17 as by a belt 18 running in a groove 19 formed by a flange 20 on a record drive disc 17 and by the peripheral portion 21 of a record disc 22 when suitably secured to disc 17 as by cementing. Record 22 is formed with the usual spiral grooves 23 carrying a sound recording.

Numeral 24 designates a flat spring providing pressure on the tone arm 37 and needle 43, and locating bushing 30 at the center of the reproducing cone 16, the ends of the spring 24 being bent downwardly at 25 and rest on bosses 26 formed on bottom part of 11. The ends of the spring also extend through notches or cutout portions 27 formed in top 12, by which arrangement the spring is securely held between the two parts of the housing. The central portion of cone 16 has a tubular formation 28 and a tubular member or bushing 30 is secured therein by a viscous coupling medium 31 of this invention. Bushing 30 extends through an opening 32 in the spring 24 and has a flange formation 33 and a groove 34 in which the marginal portion of the spring around aperture 32 extends. The spring 24 may be further retained to the bushing by a resilient ring 35 or other equivalent or flexible connection.

The numeral 37 designates generally a tone arm, one end of which is formed as a bushing 38 journaled on a pin 39 having flanged ends which extends through an aperture in spring 24 to which it is secured. Arm 37 has a central web 40 in which are longitudinally extending grooves 41 and 42 so that the tone arm is very light. It may be fabricated from plastic or other suitable light material. The free end of the tone arm secures a needle 43 which extends downwardly at a slight angle and is engagable in grooves 23 of the record 22.

Forwardly of the needle 43 the tone arm is formed with a transverse eyelet 44 through which a draw string 45 may be extended, if desired, for shifting the tone arm in the manner shown in my copending application, Serial No. 83,965, now Patent Number 3,082,006 above mentioned. Other means for shifting the tone arm may be employed if desired to initiate the playing of the record at any point on the groove system.

Near the end of the tone arm 37 at its upper part adjacent needle 43 is a transversely extending rib 46 which slidably engages the flange or rim at the lower end of tubular member or bushing 30. The tone arm is movable about its pivotal mounting so that the needle 43 can be swung from an intermediate point on the record, such as from the inner end of the playing surface to the periphery when using the draw string 45 and moves inwardly across the grooves 23 during the playing of the record.

The medium 31 which joins tubular portion 28 of the reproducing cone 16 and bushing 30 is a viscous material such as grease in shear, preferably a suitably selected silicone composition, having the characteristics of being able to transmit most audio frequencies from the bushing to the cone without appreciable loss and at the same time minimize the transmission of low frequency motions which might be created by any part of the mechanical system of the phonograph, it being understood that the needle is maintained in proper contact with the grooves 23 by the pressure of spring 24 transmitted through bushing 30. It will be understood that suitable seals may be provided, if necessary, to maintain the medium 31 in its position if its viscosity is such as to require such seals, which seals if employed will be flexible and will not be intended themselves to sound frequencies to the cone 16 from the tone arm of the phonograph.

Figure 3:
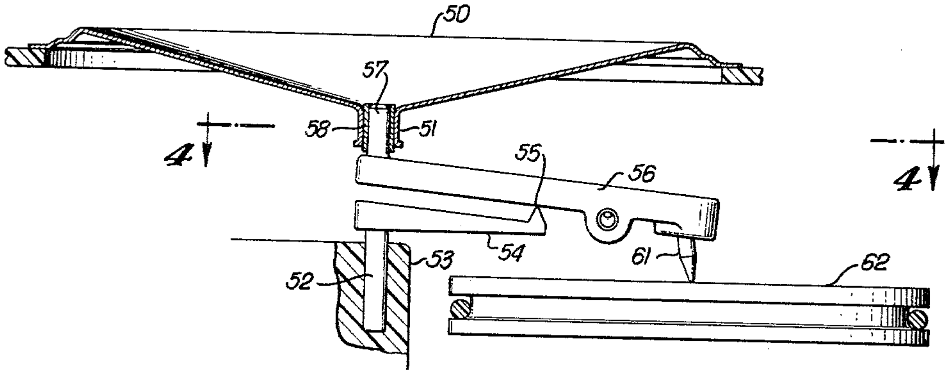
FIGURE 3 is a view partly in section of an acoustic transmission system of this invention applied to a modified form of tone arm and mounting.
Figures 4, 5:
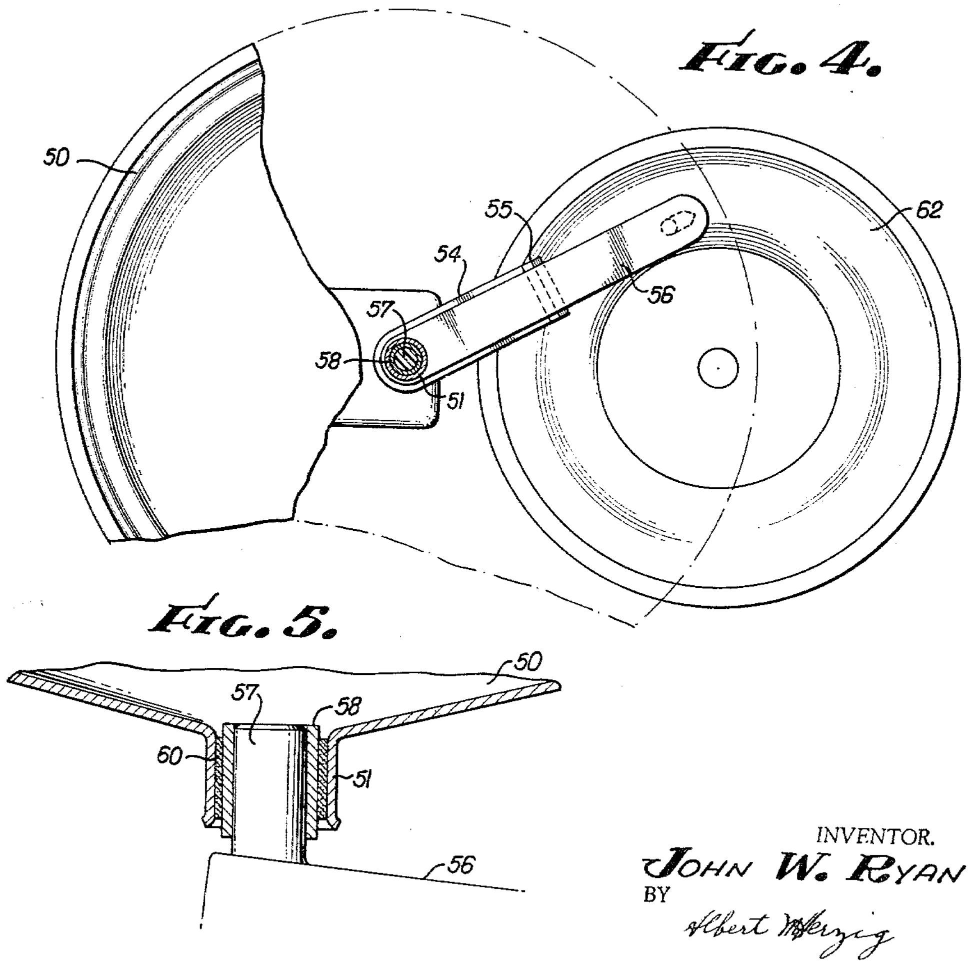
FIGURE 4 is a view of the same as seen from line 4—4 of FIG. 3.
FIGURE 5 is a fragmentary view enlarged showing the transmission system of the invention seen in FIGS. 3 and 4.

FIGURES 3 to 5 show a modified form of tone arm mounting incorporating the acoustic transmission system of this invention. In these figures the reproducing cone 50 has a tubular portion 51 at its center which is coaxial with a pin 52 journaled in a suitable bearing 53 provided by the phonograph housing. Pin 52 mounts an arm 54, the outer end of which is formed with a knife edge 55 which supports an intermediate portion of a tone arm 56 which has a bearing pin 57 contained in a bearing bushing 58. A viscous silicone grease 60, similar to medium 31, is positioned between bearing sleeve 58 and tubular portion 51 of the reproducing cone 50. The tone arm mounts a needle 61 for picking up the sound from a record 62.

It is to be understood that the invention is not to be limited to the precise forms and embodiments as disclosed herein since they are intended to be illustrative of the principles of the invention. The concept and principles of the invention may be embodied in other devices of larger size and adapted in other forms. The invention is to be accorded the full scope of the claims appended hereto.

What is claimed is:

1. In an acoustic transmission system for transmitting motion at sound frequencies, including:

(*a*) a rotatable record disc;

(*b*) a tone arm operatively engageable at its first end with said record disc;

(*c*) a sound reproducing cone;

(*d*) a sound frequency transmitting coupling connecting the central portion of said cone and the second end of said tone arm, said coupling including relatively movable members allowing movement of said tone arm relative to said record disc without movement of said cone; and (*e*) support means for said tone arm positioned between the ends thereof.

2. A system as stated in claim 1 wherein said coupling comprises a tubular portion mounted on the central portion of said cone, a bearing sleeve slidably mounted in said tubular portion and connected to the second end of said tone arm and viscous silicone grease positioned between said sleeve and said tubular portion.

3. A system as stated in claim 1 wherein said support means is positioned underneath the central portion of said tone arm.

4. A system as stated in claim 1 wherein said support means comprises an arm pivotally mounted at its first end adjacent to said record disc and supporting said tone arm at its second end by means of a knife edge.

References Cited in the file of this patent

UNITED STATES PATENTS

| | | |
|---|---|---|
| 1,302,433 | Repp | Apr. 29, 1919 |
| 3,017,187 | Ryan | Jan. 16, 1962 |